United States Patent [19]

Schnittjer

[11] Patent Number: 4,932,196
[45] Date of Patent: Jun. 12, 1990

[54] COMPOST WINDROW TURNER

[75] Inventor: Bradley J. Schnittjer, Delhi, Iowa

[73] Assignee: American Trencher, Inc., Delhi, Iowa

[21] Appl. No.: 265,879

[22] Filed: Nov. 1, 1988

[51] Int. Cl.⁵ ............................................ A01D 43/04
[52] U.S. Cl. ........................................ 56/372; 56/192
[58] Field of Search ................ 56/372, 370, DIG. 21, 56/376, 366, 192, 350–353

[56] References Cited

U.S. PATENT DOCUMENTS

| | | | |
|---|---|---|---|
| 757,303 | 4/1904 | Hawkins | 56/353 |
| 1,085,161 | 1/1914 | Reip | 56/352 |
| 1,273,312 | 7/1918 | Baum | 56/353 |
| 1,725,939 | 8/1929 | Slice | 56/351 |
| 2,195,381 | 3/1940 | Patterson | 56/192 |
| 2,390,375 | 12/1945 | Kucera | 56/370 |
| 2,629,223 | 2/1953 | Russell | 56/376 |
| 2,999,348 | 9/1961 | Cunningham | 56/192 |
| 3,496,713 | 2/1970 | Reinhardt et al. | 56/370 |
| 4,777,788 | 10/1988 | Laquerre | 56/376 |

FOREIGN PATENT DOCUMENTS 835359 6/1981 U.S.S.R. ................................ 56/370

Primary Examiner—Hoang C. Dang
Attorney, Agent, or Firm—James C. Nemmers

[57] ABSTRACT

An apparatus for turning, mixing and aerating windrows of compost to convert the waste material comprising the compost into a useable material, such as soil amendment. The apparatus includes multiple elevating conveyors that first elevate that material to mix and aerate it and then deposit the material onto secondary conveyors that move the material transversely to the windrow before it is re-deposited. In a preferred version, there are three elevating conveyors, two outside and one center conveyor with the outside conveyors depositing the material onto transverse conveyors that move the material inwardly where it is re-deposited on the ground while the center elevating conveyor deposits the material picked up from the center of the windrow on top of the material picked up by the elevating conveyors on the sides. In this manner, the material is not only mixed and aerated but completely inverted.

9 Claims, 2 Drawing Sheets

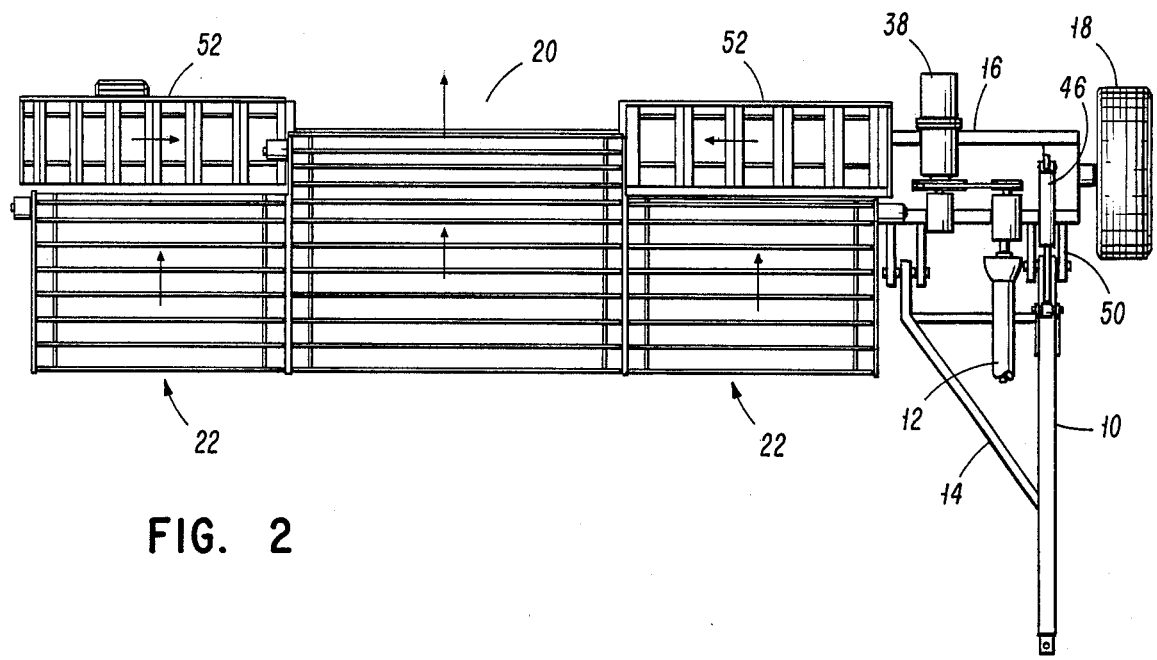
FIG. 2
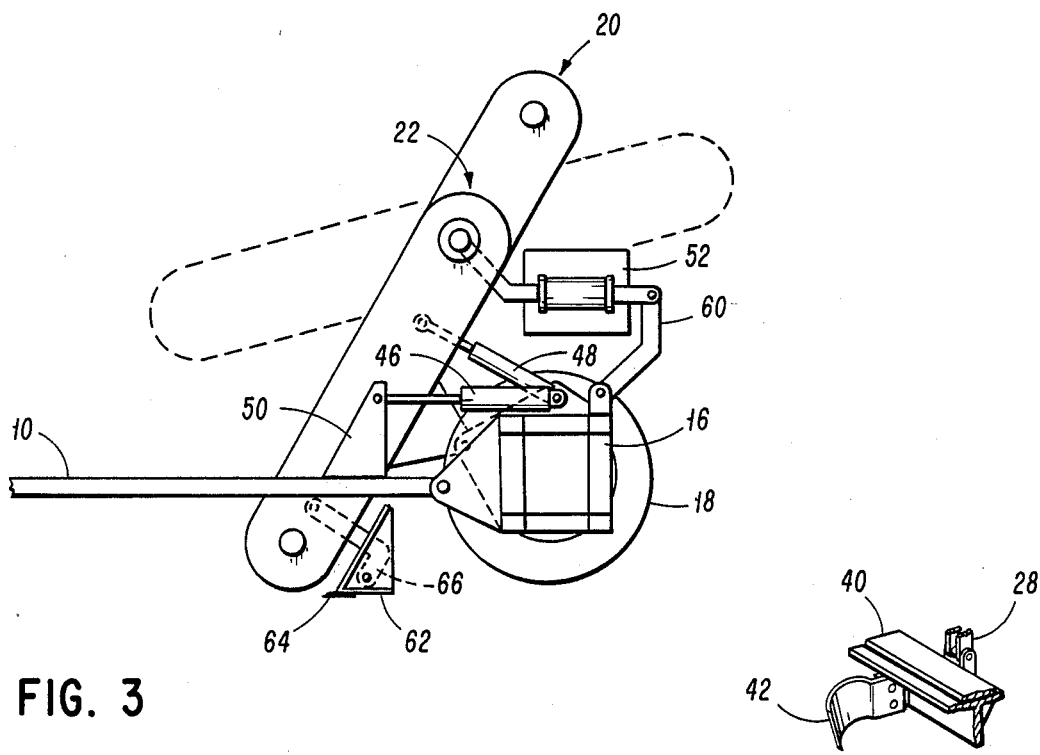
FIG. 3
FIG. 4

COMPOST WINDROW TURNER

BACKGROUND OF THE INVENTION

Composting is being used more and more frequently to convert tons of waste of all types, including solid wastes, leaves and sewage sludge, into valuable soil conditioners and soil amendments. Equipment is available for treating such wastes and windrowing the mast material. These rows of composted material utilize the naturally occurring bacterial action of biologically digesting the organic materials. Since this natural process is aerobic, the composed material must be regularly mixed and aerated in order to avoid anaerobic cores that would otherwise form in the composted rows of material. If the composted materials are properly and periodically mixed and aerated, the waste materials will break down naturally and be converted into a finished material that is stable and relatively odorless and which can be used as soil conditioners and soil amendments.

There are available a variety of different machines for aerating and mixing compost piles, especially those stored in windrows. These machines commonly use a rotating drum with flails that will turn, mix and aerate the compost. There is also known a machine that has a single elevating conveyor that utilizes a double auger than feeds the material onto an elevating conveyor which elevates all of the material and re-deposits it. However, in none of these prior art machines can positive inversion of all of the material occur. In order to produce a finished usable material that can fully utilize the natural bacterial action, the material in the compost must be not only mixed and aerated but it must be completely inverted so that the material inside the compost can be positively exposed to elevated temperatures thereby effecting pathogen kill. Unless all of the material is properly mixed, aerated and inverted on a regular basis, the bacterial action, which requires the oxygen in the air, will not be as rapid or as complete as need be to produce a usable, final product free of pathogen kill.

Also, prior art machines are relatively expensive, and require a considerable amount of maintenance, and some of them are difficult to clean. There is, therefore, a need for a simple machine that is easy to clean and which will have a long, useful life with a minimum amount of maintenance problems.

SUMMARY OF THE INVENTION

The apparatus of the invention consists of three independent vertical elevators positioned side by side to provide a vertical moving face that is divided into three sections, a center section and two side sections. This vertical moving face is moved into a windrow from one end, and as it advances at a controlled rate of speed, the two side or end sections elevate the material onto two transversely moving conveyors that move the material toward the center of the machine. These conveyors deposit the material from the windrow edges into the center of the new windrow and at the bottom of the new windrow. The center elevator picks up and elevates the core of the windrow and deposits it on top of the material from the windrow edges which now forms the center core of the new windrow. Each of the elevating conveyors also include sharp teeth that serve to break up the composted material, which is also aerated and mixed as it is elevated and re-deposited in the new windrow. The apparatus thus provides total and positive inversion of the composted material to assure the most rapid and thorough bacterial action.

BRIEF DESCRIPTION OF THE DRAWINGS

FIG. 2 is a top plan view of the apparatus of FIG. 1;

FIG. 3 is a side elevational view with components shown schematically to illustrate the operating mechanism for tilting the elevating conveyors; and FIG. 4 is an enlarged perspective view of a portion of one of the elevating conveyors and illustrating the elevating slats and teeth that form part of the conveyors.

DESCRIPTION OF THE PREFERRED EMBODIMENT OF THE INVENTION

Figure 1:
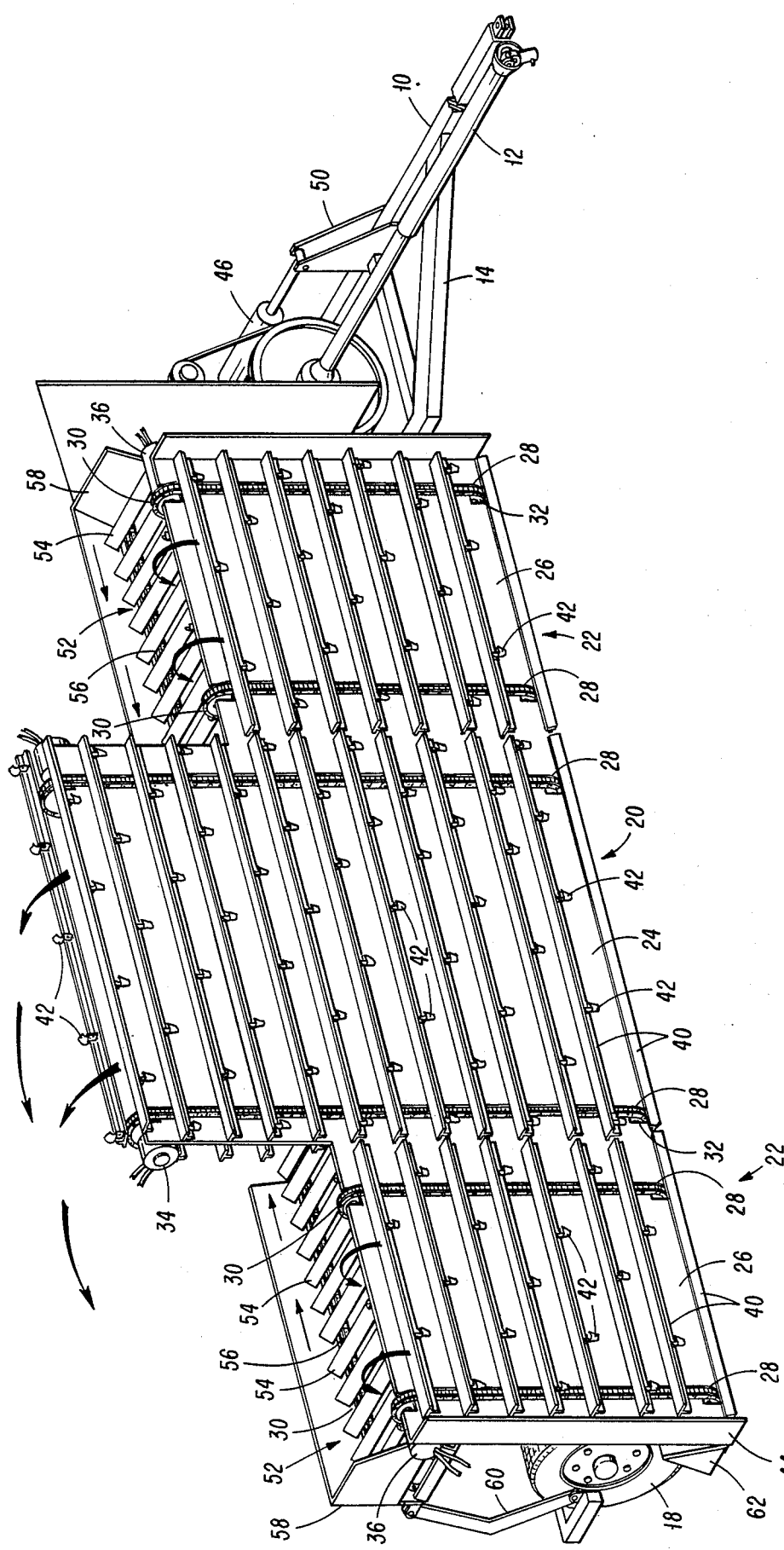
FIG. 1 is a perspective view from the right front of an apparatus constructed according to the principles of the invention and adapted for towing by prime mover such as a tractor.

In FIG. 1, I have illustrated the principles of my invention in connection with an embodiment thereof adapted for being towed behind a primer move, such as a tractor (not shown) which has a draw bar and a power take off unit. As illustrated in FIG. 1, tongue 10 is adapted to be attached to the draw bar of the tractor, while shaft 12 is adapted to be connected to the power take off unit of the tractor. Tongue 12 has support braces 14, and tongue 10 and support brace 14 are pivotally connected to the main frame member 16 of the invention. As best seen in FIGS. 2 and 3, the main frame member 16 is a box or tubular member that extends the entire width of the windrow turner. Affixed to the main frame member 16 at its outer ends are a pair of ground wheels 18.

Supported by the main frame member 16 in the manner described hereinafter are three elevating conveyors, a center elevating conveyor 20 and side elevating conveyors 22, one on each side of the conveyor 20. The central conveyor 20 has a vertically extending table 24, and similarly, each of the side conveyors 22 has a vertically extending table 26. As is evidence from the drawings, especially FIG. 1, the table 24 for the center conveyor 20 is higher than the tables 26 for the side conveyors 22. Each of the conveyors 20 and 22 is driven by a pair of endless chains 28 that are laterally spaced apart and which engage upper sprocket 30 and lower sprockets 32. Each pair of sprockets for each conveyor is mounted on a rotating shaft each of which is independently driven by a hydraulic motor. As best seen in FIG. 1, the center conveyor is driven by hydraulic motor 34 while the side conveyors are driven by separate hydraulic motors 36. Each of the motors 34 and 36 are connected into the hydraulic system which includes a pump 38 and reservoir (not shown) that supplies hydraulic fluid under pressure to each of the motor 34 and 36.

Each of the conveyors 20 and 22 is formed with a plurality of horizontal slats 40 welded or otherwise affixed to the chains 28. Slats 40 carry the particles of the waste material upwardly to the top of each of the respective conveyors where it is discharged in the manner described hereinafter. Each slat 40 is also provided with a plurality of teeth 42 welded or otherwise affixed to the slats as shown in FIG. 4. Teeth 42 assure that the waste material will be shredded and the particle size of the waste material reduced with each pass of the apparatus through a compost pile or windrow.

Although the tables 24 and 26 assist the moving slats 40 in lifting the material, it is preferable that the tables 24 and 26, and thus the conveyors 20 and 22, be tilted at an angle to the vertical. Depending upon the type of material being handled, this angle varies from 15 to 30 degrees. Also during transportation of the apparatus over the road, it is preferrable that the conveyors 20 and 22 be tilted further to facilitate ease of transportation and also to raise the lower ends of the conveyors 20 and 22 off the ground. To facilitate this, tables 24 and 24 are pivotally mounted on the main frame member 16 by support bracket 44 that is pivotally connected to the main frame member 16 as shown in FIG. 3. A pair of hydraulic cylinders, a lift cylinder 46 and a tilt cylinder 48 provide additional support and movement of the table upon actuation of the respective cylinders. Lift cylinder 46 is pivotally connected at one end to the main frame member 16, and its operating rod is pivotally connected to a pair of brackets 50 that are mounted on the tongue 10 (FIGS. 2 and 3). Thus, when the operating rod of lift cylinder 46 is retracted the tables 24 and 26 and thus the conveyors 20 and 22, can be lowered into operating position. However, with the operating rod of lift cylinder 46 is extended, the tables 25 and 26 will be elevated to a transport position as illustrated in the dotted lines of FIG. 3.

In order to adjust the vertical angle of the tables 24 and 26, depending upon the type of material to be treated, tilt cylinder 48 has one end pivotally connected to the main frame 26 while the other end is connected to the support brackets 44 for the tables 24 and 26. Thus, as the operating rod of tilt cylinder 48 is extended, the vertical angle of the tables 24 and 26 will be decreased, and conversely, as the operating rod is retracted, the vertical angle of the tables 24 and 26 will be increased. As previously indicated, the range of movement is preferrably between approximately 15 and 30 degrees.

As best seen in FIGS. 1 and 2, behind each of the side elevating conveyors 22 is a transverse conveyor 52. Each of the conveyors 52 is also a slat/type conveyors having a plurality of slats 54 moveable on endless chains 56 and independently driven by hydraulic motors (not shown). Each of the conveyors 52 is positioned directly behind and slightly below the side conveyors 22, and as illustrated in FIG. 1, conveyors 52 are driven so as to carry material inwardly where it is discharged in the area directly behind the center conveyor 20. To contain the material discharged onto conveyors 52 by the side conveyors there is preferrably provided a vertically extending shield 58. As is best seen in FIGS. 1 and 3, supporting frame work 60 supports conveyors 52, and the supporting frame work 60 is pivotally connected as shown to allow for the tilting of the tables 24 and 26 while still maintaining the conveyors 52 in a general horizontal plane.

There is also preferrably provided a crummer 62 directly behind and extending the gull width of the elevating conveyors 20 and 22. As illustrated in FIG. 3, crummer 62 has a scraper blade 64 at its forward end, and the crummer 62 is pivotally mounted by L-shaped link 66 to the support brackets 44 for the tables 24 and 26. Thus, crummer 62 is free to swing upwardly and downwardly depending upon the angles of the tables 254 and 26 so that the crummer 62 will always be in engagement with the ground to guide material into the lower end of the conveyors 20 and 22 as the apparatus moves along through a compost windrow.

The operation of the apparatus of the invention should be evident from the foregoing description. However, the operation and use of the apparatus will all be summarized. The tongue 10 is suitably affixed to the draw bar of the tractor or other prime mover, and the shaft 12 connected to the power take off unit. Using the lift cylinder 46, the unit is lifted so that conveyors 20 and 22 are sufficiently above the ground for transportation to the site where the unit will be used. At the site where the windrows of compost waste are being stored, the unit is moved into position so that the conveyor 20 is in alignment approximately with the center of the windrow at one end. The lift cylinder 46 and the tile cylinder 48 are then operated until the lower ends of the conveyors 20 and 22 are on the ground and at the proper angle for the material to be treated. With the conveyors 20 and 22 operating and with the transverse conveyors 52 also operating, the unit is then moved forwardly into the end of the compost windrow. The material in the windrow will be picked up by the conveyors 20 and 22 and carried upwardly. The material at the outside edges of the windrow will be carried upwardly by the side conveyors 22 and deposited on the transverse conveyors 52 which will carry the materially inwardly toward the center and deposit it on the ground forming the lower part of the core for the new window. The material carried upwardly by the center conveyor 20 will then be deposited directly on top of the material already deposited by the side conveyors. Since the side conveyors 22 and the center conveyor 20 are each independently operated, their speeds can be controlled to achieve the desired result. The apparatus continues to be pulled forwardly along the windrow, and as it proceeds through the existing windrow, it leaves an entire new windrow just behind. By lifting the material in small bits using the slats 40 and with the teeth 42 carried by each of the slats, the material is shredded and broken up into smaller particle size, being entrained with the maximum of air and oxygen as the materially is carried through the path provided by the elevating conveyors 20 and 22. The material is thus thoroughly mixed and aerated as it is picked up and moved by the elevating conveyors 20 and 22. The transverse conveyors 52 provide further mixing and aerating, and because of the added height of the center conveyor 20, the material will receive additional air entrapment as it falls from the top center conveyor 20. The apparatus thus provides maximum mixing, reduction of particle size and aeration while providing positive control of the material by moving outside edges of the existing windrow inwardly and on the bottom of the new windrow while the core of the existing windrow is then deposited on top. The material is thus positively inverted.

In some applications, it may be sufficient to have two elevating conveyors or a single elevating conveyor. Also, instead of two transverse conveyors 52, a single conveyor may suffice discharging on one side or the other. The particular arrangement of the elevating conveyor and transverse conveyors depend upon the type of material being handled. However, all of the variations of the invention will utilize a conveyor which first elevates the material while at the same time reducing the particle size while exposing the material to air with the material subsequently being, at least in part, moved transversely to form a new windrow. Obviously, the transverse conveyors can also be of an auger type, again depending upon the type of material being handled. Also, if desire,d the unit can be made so as to be self propelled rather than being towed. With a preferred embodiment of the invention, it is also evident that there is no necessity for space between windrows since the unit of the invention passes through the windrow and deposits the material directly behind to form a new windrow.

Having thus described the invention in connection with the preferred embodiment thereof, it will be evident to those skilled in the art that various revisions and modifications can be made to the preferred embodiment described herein without departing from the spirit and scope of the invention. It is my intention, however, that such revisions and modifications that are obvious to those skilled in the arts will be included within the scope of the following claims.

What is claimed is as follows:

1. A mobile apparatus for treating loose waste material stored in a windrow, said apparatus comprising a first conveyor means for picking up the material in the windrow and elevating the material, the first conveyor means including three separate elevating conveyors, one a center elevating conveyor with a side elevating conveyor on each side of the center elevating conveyor, the center elevating conveyor being higher than the side elevating conveyors, a second conveyor means for moving at least some of the material picked up by the first conveyor means generally transversely of the windrow and depositing the material on the ground to form a new windrow, the second conveyor means including two conveyors moving material generally transversely of the windrow, each such conveyor moving the material toward the center, the side elevating conveyors of the first conveyors means discharging the material onto the two conveyors of the second conveyor means and the center elevating conveyor of the first conveyor means discharging the material onto the material being discharged by the two conveyors of the second conveyor means, the first conveyor means including means to mix and aerate the material as it is elevated, and means providing for movement of the apparatus along the windrow.

2. The apparatus of claim 1 in which there is positioned a scraper blade extending along the entire width of the first conveyor means at its lowest edge to assure the loose material in the windrow is picked up by the first conveyor means.

3. A mobile apparatus for treating loose waste material stored in a windrow, said apparatus comprising a first conveyor means for picking up the material in the windrow and elevating the material, the first conveyor means including three separate and independently operable elevating conveyors, one a center elevating conveyor with a side elevating conveyor on each side of the center elevating conveyor, a second conveyor means for moving at least some of the material picked up by the first conveyor means generally transversely of the windrow and depositing the material on the ground to form a new windrow, the two side elevating conveyors of the first conveyor means discharging the material onto the second conveyor means, the first conveyor means including means to mix and aerate the material as it is elevated, and means providing for movement of the apparatus along the windrow.

4. The apparatus of claim 3 in which the second conveyor means includes two conveyors moving material generally transversely of the windrow, each such conveyor moving the material toward the center.

5. The apparatus of claim 4 in which the center elevating conveyor of the first conveyor means is higher than the side elevating conveyors and discharges material onto material discharged by the two conveyors of the second conveyor means.

6. The apparatus of claim 3 in which the first conveyor means includes a table extending generally vertically, and the center elevating conveyor and each side elevating conveyor of the first conveyor means includes a plurality of spaced-apart generally horizontal slats and endless moving means for supporting the slats and moving them across, over, behind and under the table.

7. The apparatus of claim 6 in which each of the slats of each of the center and side elevating conveyors includes a plurality of teeth for reducing the particle size of the loose material.

8. The apparatus of claim 6 in which there is provided means for adjusting the vertical tilt of the table and thus the three elevating conveyors of the first conveyor means.

9. The apparatus of claims 3, 4, 5, 6, 7, or 8 in which there is positioned a scraper blade extending along the entire width of the first conveyor means at its lowest edge to assure the loose material in the windrow is picked up by the first conveyor means.

* * * * *